United States Patent [19]
Little et al.

[11] Patent Number: 4,771,981
[45] Date of Patent: Sep. 20, 1988

[54] COLLAPSIBLE MOULD CORE

[75] Inventors: Walter W. Little; Peter R. Clarke, both of Basildon, England

[73] Assignee: R. Clarke & Co. (Moulds) Limited, Basildon, England

[21] Appl. No.: 898,914

[22] Filed: Aug. 21, 1986

[30] Foreign Application Priority Data

Aug. 30, 1985 [GB] United Kingdom ............... 8521591
Nov. 12, 1985 [GB] United Kingdom ............... 8527885

[51] Int. Cl.⁴ ............................................. B29C 33/02
[52] U.S. Cl. .................................. 249/79; 249/63; 249/152; 249/180; 249/184; 425/438; 425/451.5; 425/577; 425/592; 425/DIG. 5
[58] Field of Search ............... 249/59, 63, 144, 152, 249/178, 180, 184, 79; 425/577, DIG. 5, DIG. 58, 438, 451.5, 451.6, 592, 593

[56] References Cited

U.S. PATENT DOCUMENTS

| 4,209,161 | 6/1980 | Horvath | 249/180 |
| 4,362,291 | 12/1982 | Fuke et al. | 425/577 |
| 4,541,605 | 9/1985 | Kubota et al. | 425/DIG. 58 |

FOREIGN PATENT DOCUMENTS

| 1045350 | 10/1966 | United Kingdom . |
| 1592207 | 7/1981 | United Kingdom . |
| 2100172A | 12/1982 | United Kingdom . |
| 2132934A | 7/1984 | United Kingdom . |

Primary Examiner—Jay H. Woo
Assistant Examiner—James C. Housel
Attorney, Agent, or Firm—Lewis Messulam

[57] ABSTRACT

The invention relates to a collapsible core for a mould. The core comprises three relatively movable assemblies. The first assembly carries a cone, the second assembly carries an inner set of segments which form part of the core surface and engage the cone and the third assembly carries outer segments moved by inclined pins on the second assembly. As the assemblies are moved together the outer segments move radially outwards and the inner segments move axially in between them. Then the inner segments move radially outwards and the cone fills the center of the core. On reversal of the movement, the core is collapsed to enable it to be withdrawn from the moulded article.

5 Claims, 1 Drawing Sheet

COLLAPSIBLE MOULD CORE

The present invention relates to a collapsible core for a mould.

When moulding an article such as a canister with an inwardly directed lip, if the lip is only small and the plastics material is stretchable then the moulded canister can be forced off the core. If however the lip is more pronounced or the plastics material cannot stretch without damage then it is necessary to resort to a collapsible core.

There are known collapsible cores which when assembled present a cylindrical surface about which the article may be moulded but which can be collapsed for withdrawal from the moulded article.

A known form of collapsible core comprises three main components. Two of the components are rings of axially extending segments, the segments of one ring being interdigitated with those of the other. When interdigitated, the two sets of segments define a continuous annulus and a centre component slidably disposed within the annulus completes the cylindrical shape of the core. The mating surfaces of the segments of the two rings are inclined to radii of the cylinder in such a manner that when the cylindrical centre component is axially withdrawn, it is possible to move the segments of the inner ring radially inwardly by a sufficient amount to enable them to clear the lip on the moulded article so that they may be withdrawn. After the inner segments have been withdrawn, it becomes possible to move the outer ring of segments radially inwards so that they too may be withdrawn.

The segments of each ring are usually resiliently mounted at one end on a common support so that they may flex in order to clear the obstruction presented by the lip on the moulded article.

The above arrangement has several disadvantages which will now be considered. First, because the segments are pivoted on a common support, the amount of movement permissible next to the support is minimal and this places a severe constraint on the depth of the lip on the moulded article.

A second consideration, which seriously affects the cycle time of the moulding machine and the complexity of the mechanism necessary to operate an injection moulding machine automatically, is that the inner set of segments cannot be collapsed radially until the centre has been totally withdrawn axially and furthermore the second set of segments cannot be collapsed inwards until the first set of segments has been fully withdrawn. The travel required therefore to permit the moulded article to be extracted from the mould amounts to twice the length of the article or, put differently, the length of the core mechanism when the moulded article can be withdrawn is three times its length when the core is in the mould. In the case of some articles, such as a five litre paint canister, this amount of travel cannot readily be accommodated, but in any event the time taken to withdraw the component parts of the collapsible core sequentially from the interior of the moulded article would be excessive and not commerically viable. Of course, if this withdrawal of the collapsible core is to be carried out automatically then the control system must be designed to ensure that the three phases are carried out sequentially and this results in undue complexity which is reflected not only in increased cost but also in reduced reliability.

There are also known various collapsible mould cores which comprise an outer casing segmented to define two sets of interengaging segments and a central core in the form of a truncated cone.

In these cores, examples of which are to be found in British Pat. Nos. 1,045,350 and 1,592,207 and in GB-A-2 100 172 and GB-A-2 132 934, the two sets of segments do not move axially relative to one another. instead, one set of segments acts as wedges between the segments of the other set and as the core is withdrawn both sets of segments are radially retracted simultaneously, the collapse of the segments acting as radial wedges enabling the second set to be retracted sufficiently to clear the obstruction presented by the lip on the moulded article.

When the segments of a collapsible mould core always remain in the same axial plane as one another, the degree of collapse is limited. The reason for this is that the total permissible movement of the outer segments is equal only to the outer thickness of the inner segments which act as wedges. These segments must taper radially outwards if they are to be capable of collapse and any attempt to extend the thickness of the wedge segments at their radially outer ends also results in an increased thickness at their inner ends and this will prevent the radial retraction of the wedge segments as they then collide with one another.

A further collapsible core is described in GB-A-2 135 236, in which there are two pairs of segments which are keyed in to the four faces of a tapering centre having the shape of a four sided pyramid. The keyways connecting to the first pair of segments have radial slack to permit the centre to be withdrawn without any movement of the first pair of segments but causing radial movement of the second paii of segments. After radial collapse of the second pair of segments they are axially withdrawn with the centre while the first pair of segments remain within the mould cavity but are moved radially by the withdrawal of the centre, the slack in the keyways having now been taken up by the initial withdrawal of the centre. Finally after the first pair of segments have moved radially inwards to clear the obstruction caused by the moulded article they too are axially withdrawn from the female mould.

In the above construction, the number of segments is restricted to four which places a limitation on the degree of collapse of the core and furthermore as all the segments are keyed into the tapering centre, the degree of collapse is limited by the amount of slack in the keyways connecting the first pair of segments to the centre.

All the known attempts at forming a collapsible core have therefore, albeit for different reasons, placed limitations on the degree of collapse that is achievable in practice for any given diameter. There have also been problems, as earlier described, in connection with the operation of some cores while those with segments exclusively movable radially have been of complex design and suspect reliability as their segments rub against one another during use.

The present invention seeks to provide a collapsible core for a mould which mitigates at least some of the foregoing disadvantages.

According to the present invention, a collapsible core for a mould comprising an inner and an outer set of interdigitated segments which together define a continuous annulus and a tapering centre disposed within the said annulus to complete the surface of the collapsible core, the tapering centre being movable axially relative to both sets of segments and the sets of segments being further movable axially relative to one another, characterised in that the core comprises three assemblies movable relative to one another in the direction of the axis of the core, in which the first assembly supports the tapering centre the second assembly has a first supporting plate on which the first set of segments is mounted for radial movement, and the third assembly has a second supporting plate on which the second set of segments is mounted for radial movement, first guide means are provided connecting the first and second assemblies and causing the first set of segments to move radially on the first support plate in response to axial movement of the first assembly relative to the the second assembly, and second guide means are provided connecting the second and third assemblies and causing the second set of segments to move radially on the second support plate in response to axial movement of the second assembly relative to the the third assembly.

Conveniently, the segments of said one set are tapered radially, being narrower nearer the circumference and are also tapered axially, being narrower nearer their free ends. By virtue of the axial as well as the radial taper of the first set of segments, the clearance afforded for the collapse of the segments of the other set is increased for a given relative displacement.

Advantageously, the assemblies are connected to one another by a mechanical mechanism capable of ensuring correct synchronisation of their relative movement. The mechanism for synchronising the movement of the assemblies may conveniently comprise a cam supported by the centre assembly and cam followers on arms, pivotably arranged in the manner of lazy tongues, on the other two assemblies. This simple mechanism linking the movements of the assemblies to one another enables the correct necessary synchronisation to be achieved economically and reliably.

Because the radial movement and the axial movement of the segments occur simultaneously, and because the centre is tapering rather than cylindrical, it is not necessary for the centre to clear the segments before the latter can commence radial movement, which is the case in the prior art arrangements in which the sets of segments are movable axially relative to one another. The radial collapse of the core is therefore no longer dependent upon the length of the core. A much shorter stroke suffices to clear the lip on the moulded article and the extent of movement necessary is determined solely by the depth of the lip to be cleared.

Furthermore, in contrast to the arrangements wherein the sets of segments always remain in the same axial plane as one another, the core of the invention permits the use of wedge segments of significantly greater thickness since the axial retraction of these segments enables their withdrawal without collision.

Because the segments are guided for radial movement and do not flex, the segments need not be of spring material and no limitation is placed on the extent of their deflection to clear the obstruction presented by the lip on the moulded article. As the segments move radially along their entire length, it is also of little consequence whether the lip on the article is near the open or closed end of the moulded article.

It is particularly preferred that the segments should be moved by a mechanical interaction with the movement of the assemblies, for example through gearing, cams or guides, so that the only force required to collapse and expand the entire core is that required to move the assemblies apart and together.

The invention will now be described further, by way of example, with reference to the accompanying drawings, in which.

Figure 1:
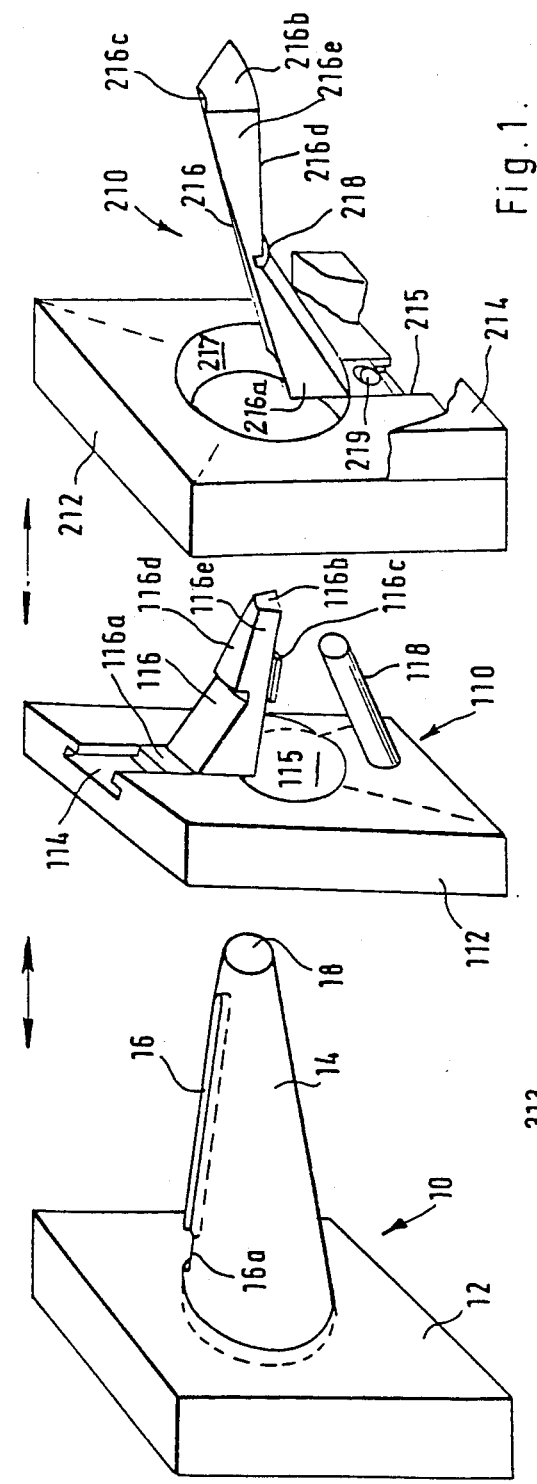
FIG. 1 is a partial exploded view of a collapsible mould core of the invention.

In FIG. 1, the collapsible mould core of the invention comprises three relatively movable assemblies which are generally designed 10, 110 and 210. Each of the respective assemblies includes a plate 12, 112 and 212, the three plates being accurately guided for movement relative to one another in a synchronised manner to be described below. The plates are guided for axial movement by means of rods secured to the plate 12 and bores in the other two plates but these are omitted from the drawings in the interest of clarity.

The first plate 12 carries a fixed cone 14 which is formed with three grooves 16 equally spaced around the circumference of the cone 14. The grooves 16 are grooves of T-shaped cross-section so that a matching slider introduced into the grooves can slide along the grooves but cannot be withdrawn radially. A lead-in portion 16a is provided for introduction of such sliders into the grooves. The axial end face 18 of the cone 14 forms the central part of the collapsible mould core surface.

The plate 112 of the assembly 110 has three radially extending guide slots 114 symmetrically surrounding a central aperture 115 and aligned with the grooves 16. Only one such guide slot 114 is shown in the interest of clarity, the other two being identical and being represented only by dotted lines.

Each guide slot 114 has slidably received within it the base 116a of one of the inner segments 116 which define part of the cylindrical surface of the collapsible mould core. Each base 116a has a slider 116c received in the respective groove 16 of the cone 14 of the assembly 10, and a T-section received in the slot 114. The result of moving the plate 12 towards the plate 112 is that the inner segments 116 move radially outwards along their respective slots 114 as they slide along the grooves of the cone 14.

The surfaces of the segments 116 which form part of the mould core are their axial end faces 116b and a surface 116d which has the form of a tapering segment of a cylinder, the angle subtended by the segment at the axis becoming smaller when moving towards the free axial end of the segment.

The radially inner surface of each inner segment is a part conical surface matching the cone 14 when the two plates 12 and 112 are fully collapsed against one another.

The side faces 116e of the inner segments 116 also taper radially outwards as can best be seen from FIG. 3, so that once the cone is withdrawn they may collapse radially inwards without interference from the outer segments to be described below.

Three angled guide pins 118 (again only one is shown) are provided one diametrically opposite each of the slots 114. The purpose of the guide pins 118 will be clear from the description of the third assembly 210.

The third assembly 210 comprises two plates 212, 214 secured to one another. The plate 212 has three slot 215 symmetrically surrounding a central aperture 217 and aligned with the guide pins 118. The slots 215 receive the bases 216a of three outer segments 216 so that the latter may slide radially.

The bases 216a which slide along the slots 215 are formed with angled holes 219 receiving the angled pins 118 so that the radial movement of the outer segments is effected by the axial movement of the plates 112 and 212 relative to one another.

Figure 3:
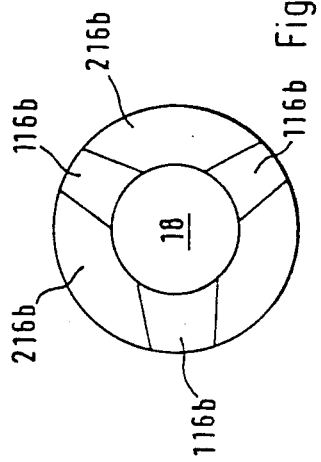
FIG. 3 shows the end surface of the mould core.

Each outer segment 216 has an end surface 216b which forms part of the end surface of the collapsible mould core (see FIG. 3). The outer cylindrical surface 216d is part-cylindrical and tapers towards the plate 212, that is to say its circumferential extent increases towards the free end in a manner complementary to the tapering of the inner segments 116. The inner cylindrical surface 216c matches the surface of the cone when the assemblies abut one another to complete the surface of the core in the manner shown in FIG. 3. Similarly, the side surfaces 216e taper inwards as best shown in FIG. 3 to permit the inner segment to collapse by moving inwards radially.

The plate 214 forms one end surface of the mould and its thickness extends to a return portion 218 of the segments 216, the return portion being responsible for the formation of the lip on the end of the moulded article.

Let it now be assumed that the three assemblies are collapsed into one another to the maximum possible extent with the sliders 116c received in the grooves 16 and the guide pins 118 received in the holes 219 in the bases 216a of the outer segments 216. The lengths of the cone 14, the inner segments 116 and the outer segments 216 are such that in this position their end surfaces are flush with one another and mate accurately to define the end surface of the core as shown in FIG. 3. The cylindrical surface of the core is formed by the outer cylindrical surfaces of the inner and outer segments 116 and 216, respectively. At the end of the cylindrical outer surface of the core a small return or reduced diameter portion is formed by the return portions 118 of the segments but such a reduced diameter portion may be formed wherever desired along the length of the segments and need not necessarily be at the end.

During use, the outer part of the mould (not shown) surrounds the collapsible core to form a mould cavity having in the case of the example illustrated the shape of a paint canister. After an article has been moulded the core must be collapsed so that the part of the article moulded into the return portion may clear the larger diameter outer surface of the core. This operation is carried out by moving the three assemblies apart.

First, the assembly 10 is moved away from the other two assemblies without any significant relative movement between the assemblies 110 and 210. As the cone 14 is retracted, the sliders 116 slide along the grooves 16 and move radially inwards. Because the inner segments 116 taper outwards when viewed axially, they are unimpeded in their movement by the outer segments. Thus the inward movement of the inner segments occurs simultaneously with the withdrawal of the central cone.

When the inner segments have cleared the obstruction presented by the lip on the moulded article, they may commence to be withdrawn axially, even though the cone has not yet been fully withdrawn from the centre. Thus, as soon as the inner segments 116 have been radially moved in sufficiently, the two assemblies 110 and 210 are move apart. Because the inner segments 116 taper lengthways these can now be withdrawn easily from the outer segments 216. As the assemblies move apart, the pins 118 interact with the holes 219 to move the outer segments radially inwards and again it is noted that the inwards movement occurs simultaneously with the withdrawal of the inner segments.

When the inner segments have been fully withdrawn, the outer segments will have collapsed radially to allow the moulded article to be removed from the core without any obstruction.

The total amount of movement required is determined by the depth of the obstruction to be cleared, the angle of the cone 14 and the angle of the inclined pins 118. It is not dependent upon the axial length of the core. This is to be contrasted with the prior art arrangement wherein the centre was nearly cylindrical rather than conical and before the outer segments could be collapsed first the centre had to be moved the full axial length of the core and then the inner segments had to be moved by the same distance.

Figure 2:
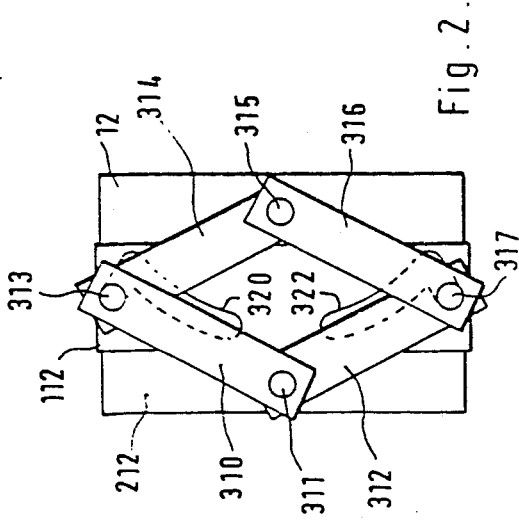
FIG. 2 shows diagrammatically the linkage for assuring synchronised movement of the three assemblies of FIG. 1.

To effect the movement of the assemblies in the correct phase a linkage such as shown in FIG. 2 may be employed. This likage comprises a lazy tongues like arrangement comprising four levers 310, 312, 314 and 316. The levers 314 and 316 are connected by means of a common pin 315 to the plate 12. Similarly, the levers 310 and 312 are connected by a common pin 311 to the plate 212. The levers 310 and 314 are connected by means of a cam follower pin 313 and the levers 312 and 316 are connected by means of a second cam follower pin 317. The cam follower pins follow L-shaped cams 320 and 322 carried by the plate 112.

If the plate 12 is stationary and force is applied to the plate 212, then first the pins 313, 317 will follow the cams 320, 322 so that little movement occurs between the plates 212 and 112 but these two plates are moved together away from the plate 12. When the pins reach the corners in the cams, the lazy tongues collapse inwards with no movement between the plates 12 and 112 but with the plates 112 and 212 being moved apart.

Thus by a single mechanism operating the lazy tongues, the assemblies are moved apart and together and the segments are automatically moved in synchronism to assemble and collapse the core.

It will be noted that in the preferred embodiment described and illustrated in the drawings, each of the segments has a base in the form of a slider which is guided for radial movement, the end surface at the radially outer end of each slider being accessible in all positions of the mould. It is therefore possible to form in each segment passages for a coolant and flexible pipes may be attached to this surface of the segments to act as supply and return pipes for coolant. In view of the limited amount of movement of the parts of the core, there need not be excessive slack in the pipes and they do not risk becoming entangled in the mechanical parts of the mould.

It is further more possible to cool the cone 14 so that every surface in contact with the moulded article may be cooled by a circulating coolant. Because of this improved cooling, it is possible to reduce still further the cycle time required for the moulding of each article.

We claim:

1. A collapsible mould core having a central longitudinal axis and an outer cup-like shaping surface, the core comprising an inner and an outer set of interdigitated segments (116, 216) which together define a continuous annulus and a tapering centre (14) disposed within said annulus to complete the end portion of the shaping surface of the collapsible core, the tapering centre (14) being movable axially relative to both sets of segments (116, 216) and the sets of segments (116, 216) being further movable axially relative to one another, wherein (a) the core comprises three assemblies (10, 110, 210) movable relative to one another in the direction of the axis of the core, in which the first assembly (10) supports the tapering centre (14), the second assembly (110) has a first supporting plate (112) on which the first set of segments (116) are mounted such that they are movable radially but fixed axially relative to the first supporting plate (112), and the third assembly (210) has a second supporting plate (212) on which the second set of segments (216) are mounted such that they are movable radially but fixed axially relative to the second supporting plate (212), (b) first guide means (16, 116c) connect the first and second assemblies (10, 110) and cause the first set of segments (116) to move radially on the first support plate (112) in response to axial movement of the first assembly (10) relative to the the second assembly (110), and (c) second guide means (118, 219) connect the second and third assemblies (110, 210) and cause the second set of segments (216) to move radially on the second supporting plate (212) in response to axial movement of the second assembly (110) relative to the the third assembly (210).

2. A collapsible mould core as claimed in claim 1, wherein the assemblies (10, 110, 210) are connected to one another by a mechanical linkage for ensuring correct synchronisation of their movement.

3. A collapsible mould core as claimed in claim 2, wherein the linkage for synchornising the movement of the assemblies comprises a cam (320,322) supported by the second assembly (112) and link arms (310, 312, 314, 316) pivotably mounted on the other two assemblies (10, 210) having cam follower pins (313, 317) following the cam.

4. A collapsible mould core as claimed in claim 1, wherein said first guide means includes a slider mounted on each of the segments of the second assembly, said sliders being received in respective longitudinal grooves in the tapering centre; and said second guide means includes inclined guide pins mounted on the first supporting plate, each guide pin being engaged by a respective segment of the third assembly, whereby the movement of the two sets of segments (116, 216) is automatically synchronised with the relative movement of the assemblies (10, 110, 210) and whereby the only force required to collapse and expand the core is that required to move the assemblies axially relative to one another.

5. A collapsible mould core as claimed in claim 1, wherein a coolant circuit passes through the segments (116, 216) and through the trapering centre (14) to cool the shaping surface in contact with the moulded article.

* * * * *